US010489267B2

(12) United States Patent
Movsisyan

(10) Patent No.: US 10,489,267 B2
(45) Date of Patent: Nov. 26, 2019

(54) TAKING AN ACTION IN RESPONSE TO DETECTING AN UNSUPPORTED LANGUAGE IN A LOG

(71) Applicant: VMware, Inc., Palo Alto, CA (US)

(72) Inventor: Vardan Movsisyan, Yerevan (AM)

(73) Assignee: VMWARE, INC., Palo Alto, CA (US)

( * ) Notice: Subject to any disclaimer, the term of this patent is extended or adjusted under 35 U.S.C. 154(b) by 242 days.

(21) Appl. No.: 15/357,149

(22) Filed: Nov. 21, 2016

(65) Prior Publication Data

US 2018/0143972 A1 May 24, 2018

(51) Int. Cl.
| | |
|---|---|
| *G06F 11/34* | (2006.01) |
| *G06F 15/16* | (2006.01) |
| *G06F 17/40* | (2006.01) |
| *G06F 9/44* | (2018.01) |
| *G06F 11/36* | (2006.01) |
| *G06F 11/30* | (2006.01) |

(52) U.S. Cl.
CPC ............ *G06F 11/3476* (2013.01); *G06F 9/44* (2013.01); *G06F 11/30* (2013.01); *G06F 11/36* (2013.01); *G06F 15/16* (2013.01); *G06F 17/40* (2013.01)

(58) Field of Classification Search
CPC ...... G06F 9/454; G06F 17/275; G06F 17/277; G06F 17/28; G06F 21/552; H04L 63/10; H04L 63/205
See application file for complete search history.

(56) References Cited

U.S. PATENT DOCUMENTS

| | | | | |
|---|---|---|---|---|
| 5,917,484 A | * | 6/1999 | Mullaney | G06F 17/27 704/8 |
| 6,073,090 A | * | 6/2000 | Fortune | G06F 9/454 704/8 |
| 8,285,541 B2 | | 10/2012 | Brun | |
| 8,825,692 B1 | * | 9/2014 | Telnov | G06F 17/2229 707/760 |
| 9,501,295 B2 | * | 11/2016 | Rodet | G06F 9/454 |
| 10,007,535 B1 | * | 6/2018 | Chopra | G06F 9/454 |
| 10,073,917 B2 | * | 9/2018 | Travieso | H04L 67/02 |
| 2003/0115186 A1 | * | 6/2003 | Wilkinson | G06F 17/3087 |
| 2006/0200766 A1 | * | 9/2006 | Lakritz | G06F 15/00 715/234 |
| 2009/0326918 A1 | | 12/2009 | Georgiev et al. | |
| 2013/0013286 A1 | * | 1/2013 | Rodet | G06F 9/454 704/3 |
| 2013/0124987 A1 | * | 5/2013 | Lakritz | G06F 17/289 715/264 |
| 2015/0254236 A1 | * | 9/2015 | Moravitz | G06F 17/289 704/2 |
| 2017/0116067 A1 | * | 4/2017 | Damron | G06F 11/0778 |
| 2017/0116068 A1 | * | 4/2017 | Damron | G06F 11/0778 |
| 2018/0191822 A1 | * | 7/2018 | Kairali | H04L 67/1095 |

* cited by examiner

*Primary Examiner* — Matthew H Baker

(57) ABSTRACT

The present disclosure is related to devices, systems, and methods for taking an action in response to detection of an unsupported language in a log. An example system can include instructions to analyze a log of a log source, detect an unsupported language in the log, and take an action in response to detecting the unsupported language in the log.

16 Claims, 3 Drawing Sheets

TAKING AN ACTION IN RESPONSE TO DETECTING AN UNSUPPORTED LANGUAGE IN A LOG

BACKGROUND

A plurality of log sources providing a same or similar functionality can exist in a network. The plurality of log sources can be monitored by a log management server. For example, a log management server can monitor a number of email servers.

DETAILED DESCRIPTION

Figure 1:
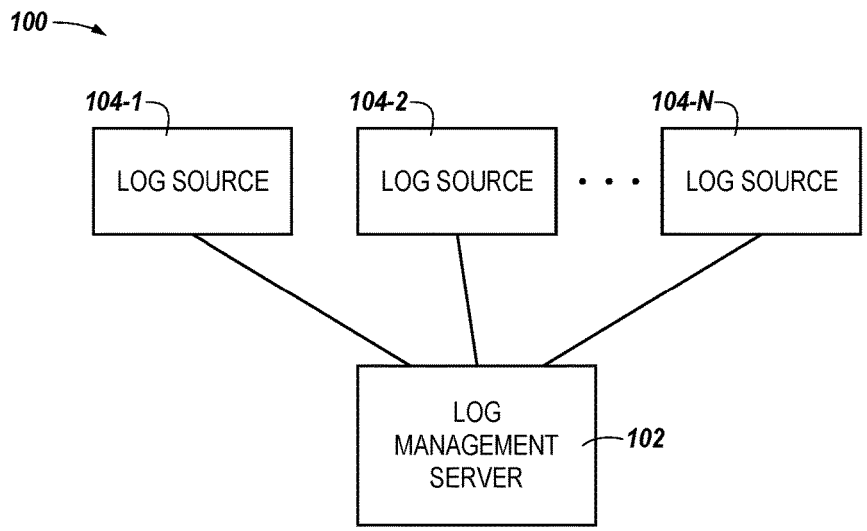
FIG. 1 is a general logical diagram of an infrastructure for taking an action in response to detection of an unsupported language in a log according to the present disclosure.

A log management server can be configured to detect an unsupported language in a log (e.g., an event log) and take an action in response to detecting the unsupported language in the log. As used herein, "language" refers to a language such as Armenian, English, German, and Spanish, amongst others, as opposed to a programming or other type of language. For example, a log management server may support the English language in a log but receive a log and detect the Armenian language in the log. A log can be a record of events that occurred on a corresponding log source that generated the log. For example, the log can be a record of errors that occurred on the log source. A log can be generated by a log source. As used herein "log source" refers to a source of one or more logs. In general, a log source can refer to any entity capable of generating logs. For instance, a log source can be a server (e.g., a physical server), a virtual computing instance (VCI), a host, a network device, a desktop computing device, an event channel, a log aggregator, a log file, etc.

The log management server can take an action in response to detecting an unsupported language in a log. One such action taken in response to detecting an unsupported language in a log, for example, can be retrieving a language pack corresponding to the unsupported language. As used herein, "language pack" refers to logic for identifying patterns, such as a pattern of events, corresponding to a particular language in a log where the particular language is in the log. In some embodiments, the action can be alerting an administrator of the log source that generated the log in the unsupported language or an administrator of a log manager server that does not support the unsupported language. In some embodiments, a log manager server can be configured to determine an availability of a language pack corresponding to the unsupported language.

In previous approaches, when a log management server receives a log in an unsupported language the resulting behavior of the log management server may be undefined, and unpredictable. For example, the log management server may not perform any analytics on the log because it does not contain a pattern that would trigger analysis of the log (e.g., performing analytics on the log). As another example, the log management server may send a false alert based on the log containing a pattern that the log management server perceives as corresponding to a particular alert. That is, if the log management server supported the unsupported language, then the particular alert would not have been triggered. However, the log management server perceives a pattern in the log in the unsupported language as corresponding to the particular alert and triggers the particular alert.

To alleviate these shortcomings, the present disclosure is directed towards not only detecting an unsupported language but also taking an action in response to detecting the unsupported language. Stated another way, embodiments herein can take a number of actions in response to receiving a log in an unsupported language. As a result, embodiments of the present disclosure can avoid undefined behavior of a log management server, including but not limited to a false positive (e.g., triggering an alert when the alert should not be triggered) and a false negative (e.g., not triggering an alert when the alert should have been triggered).

Embodiments herein can detect a pattern of events based on respective logs (e.g., event logs) associated with log sources. The log sources can create these logs and communicate them to a log management server. The log management server can monitor the logs, determine events included in the logs, and detect patterns of the events based on information in the log including, for instance, timing and/or source(s) of events.

A log source can be a VCI, which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a log management server. In some embodiments, the log management server can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. A group or plurality of similar elements or components may generally be referred to herein with a single element number. For example a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a general logical diagram of an infrastructure for taking an action in response to detection of an unsupported language in a log according to the present disclosure. The system 100 can include a log management server 102 coupled to (e.g., in communication with) a number of log sources 104-1, 104-2, . . . , 104-N (referred to generally herein as "log sources 104"). The log sources 104 can provide a same functionality. In a number of embodiments, the log sources 104 can be servers, such as file servers, print servers, communication servers (such as email servers), remote access servers, firewall servers, application servers, database servers, web servers, and others. Embodiments herein do not limit the log sources 104 to a particular type and/or functionality. The log management server 102 and the number of log sources 104 are described in greater detail below in the description associated with FIG. 2.

The log sources 104 can each record a log of activities that occur on the log sources 104. Logs can be recorded in real time, for instance. In some embodiments, logs can detail log source interaction with a client, for instance. In some embodiments, logs can track aspects of a number of applications and/or programs. In some embodiments, logs can track physical and/or virtual hardware usage. The logs can be communicated from the log sources 104 to the log management server 102. In some embodiments, the logs can be received by the log management server 102 from the log sources 104. In some embodiments, the logs may be first communicated to a log aggregator and then communicated from the log aggregator to the log management server 102.

A log can be a record of events that occurred on a corresponding log source (e.g., the log source 104-1) that generated the log. For example, the log can be a record of errors that occurred on the log source 104-1. The log can include a timestamp of an event and/or a source of the event (e.g., an IP address of a client). If the log contains a particular pattern of events, then the particular pattern of events can trigger a corresponding behavior of the log management server 102. The log management server 102 can analyze the log, identify one or more patterns of events in the log, and trigger a corresponding behavior.

The log management server 102 can analyze a log of a log source, for example, the log source 104-1, detect an unsupported language in the log, and take an action in response to detecting the unsupported language in the log. In some embodiments, the log management server 102 can automatically determine what language comprises the unsupported language. For example, if the log management server 102 supports the English language in the log but the Armenian language is in the log, then the log management server 102 can determine the Armenian language in the log. In some embodiments, the log management server 102 can retrieve a language pack corresponding to the unsupported language in response to detecting the unsupported language in the log. After retrieving the language pack, the log management server 102 can use the retrieved language pack to identify one or more patterns of events in the log to trigger one or more behaviors while maintaining the unsupported language in the log.

In some embodiments, the log management server 102 can alert an administrator of the log source 104-1, which generated the log, or an administrator of the log management server 102 that the log contained the unsupported language in response to detecting the unsupported language in the log. The alert can include, but is not limited to, an e-mail, a text message (e.g., a Short Message Service (SMS) message), or an in-management-app alert.

In some embodiments, the log management server 102 can deny receipt of future logs, from the log source 104-1, containing the unsupported language in response to detecting the unsupported language in the log. Denying receipt of future logs from the log source 104-1 can avoid undefined behavior of the log management server 102 such as a false alert or using resources to perform unwarranted analytics on the log.

Figure 2:
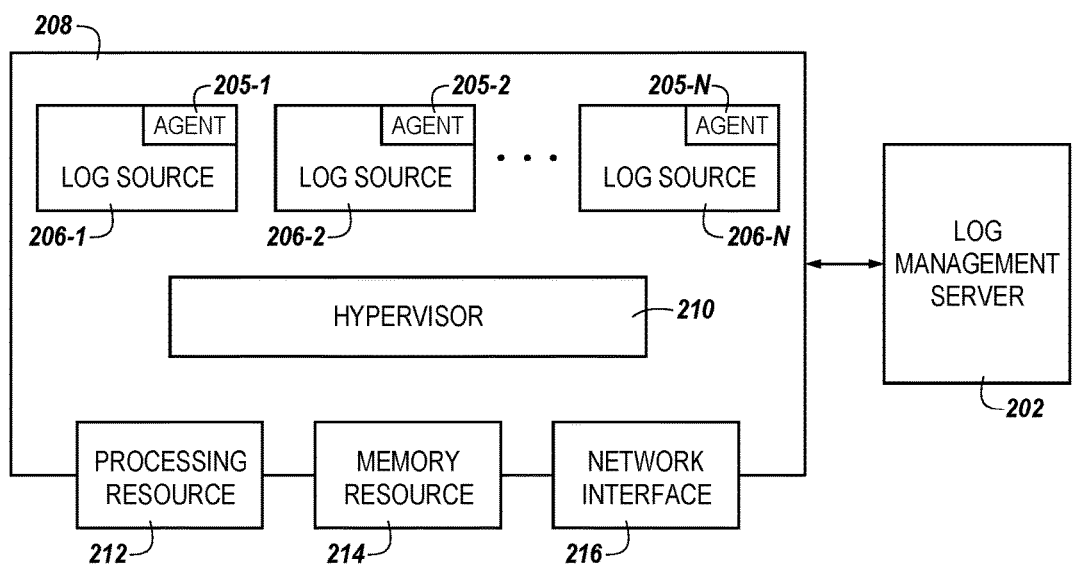
FIG. 2 is a diagram of an example of an infrastructure for taking an action in response to detection of an unsupported language in a log according to the present disclosure.

FIG. 2 is a diagram of an example of an infrastructure for taking an action in response to detection of an unsupported language in a log according to the present disclosure. FIG. 2 illustrates a host 208 for taking an action in response to detection of an unsupported language in a log. It is noted that embodiments of the present disclosure are not limited to the host 208 illustrated in FIG. 2; as previously discussed, taking an action in response to detection of an unsupported language in a log can be provided in other environments. The host 208 can include processing resources 212 (e.g., a number of processors), memory resources 214, and/or a network interface 216. Memory resources 214 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 214 may comprise primary and/or secondary storage.

The host 208 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 208 can incorporate a hypervisor 210 that can execute a number of VCIs 206-1, 206-2, . . . , 206-N that can each provide the functionality of a log source, as previously discussed. As such, the VCIs may be referred to herein as "log sources." The log sources 206-1, 206-2, . . . , 206-N are referred to generally herein as "log sources 206" and can be analogous to the log sources 104 illustrated in FIG. 1. The log sources 206 can be provisioned with processing resources 212 and/or memory resources 214 and can communicate via the network interface 216. The processing resources 212 and the memory resources 214 provisioned to the log sources 206 can be local and/or remote to the host 208. For example, in a software defined data center, the log sources 206 can be provisioned with resources that are generally available to the software defined data center and are not tied to any particular hardware device. By way of example, the memory resources 214 can include volatile and/or non-volatile memory available to the log sources 206. The log sources 206 can be moved to different hosts (not specifically illustrated), such that different hypervisors manage the log sources 206. The host 208 can be in communication with a log management server 202. The log management server 202 can be analogous to the log management server 102 illustrated in FIG. 1.

The log sources 206 can each include an agent, which can provide services (e.g., functionality) to the log sources 206. For example, each log source 206 can include a respective logging agent 205-1, 205-2, . . . , 205-N (referred to generally herein as logging agents 205). In some embodiments, the logging agents 205 can employ (e.g., execute) a log analytics functionality. The log management server 202 can be configured to receive a log from any of the log sources 206. The logging agents 205 can record logs associated with the log sources 206. The logging agents 205 can communicate (e.g., report) the logs to the log management server 202. In some embodiments, the logging agents 205 can report the logs to the log management server 202 in real time and/or in response to a request. In some embodiments, the logging agents 205 can analyze logs of their respective log source, including detecting and reacting to unsupported languages. For example, the logging agent 205-1 analyzes logs only of the log source 206-1; the logging agent 205-2 analyzes logs only of the log source 206-2; and the logging agent 206-N analyzes only logs of the log source 204-N.

The log management server 202 can receive a log from a log source, for example the log source 206-1, analyze the log according to one or more particular language packs, and take an action in response to text of the log corresponding to any language pack different than the one or more particular language packs. The log management server 202 can analyze the log in an original language of the log. That is, the log management server 202 can identify patterns in the log without translating the log. The log management server 202 can provide an alert to an administrator device in response to text of the log corresponding to any language pack different than the particular language pack. As used herein, "an administrator device" refers to a device used by an administrator of a log source, which may have generated a log in the unsupported language, or an administrator of a log management server. The administrator device can include, but is not limited to, a mobile device, a laptop computer, or a desktop computer. The alert can include, but is not limited to, an e-mail, a text message (e.g., a SMS message), or an in-management-app alert. Alerting an administrator, avoids the administrator from assuming that there are no issues with the log sources 206 or the log management server 202 by way of false positives or false negatives as described above.

In some embodiments, the log management server 202 can determine if the particular language pack can be used to process the text of the log. That is, the log management server 202 can determine if the particular language pack comprises the logic capable of identifying patterns in a log in the particular language. The log management server 202 can determine if the particular language pack can be used to process the text of the log by recognize a trigger of the log that facilitates identification of a corresponding language pack (e.g., the language pack corresponding to the unsupported language). That is, the trigger can identify a particular language in the log (e.g., identifying the Armenian language in the log). The trigger can be in the log, such as a regular expression (regex) matching log line, a field from the standard Syslog RFC 5424, or a manually specified tag. The trigger can be in metadata of the log (e.g., "out of the log"), such as a log source Internet Protocol (IP) address geo-location (e.g., an IP address of the log source 104-1) or an IP address of the log management server 202.

In some embodiments, the log management server 202 can automatically download the corresponding language pack in response to the corresponding language pack being different than the particular language pack. That is, if a language of the log received by the log management server 202 is different than the one or more languages supported by the log management server 202, then the log management server 202 can automatically download the language pack corresponding to the language. Therefore, undefined behavior of the log management server 202 can be avoided and the log can be appropriately analyzed using the downloaded language pack. The log management server 202 can automatically analyze the log with the corresponding language pack after downloading the corresponding language pack. The corresponding language pack can include a set of rules for processing the log. The set of rules can be used to govern the behavior of the log management server 202 in response to identifying patterns in the log.

In some embodiments, the log management server 202 can include a combination of software and hardware, or the log management server 202 can include software and can be provisioned by the processing resource 212. An example of the log management server 202 is illustrated and described in more detail with respect to FIG. 3.

Figure 3:
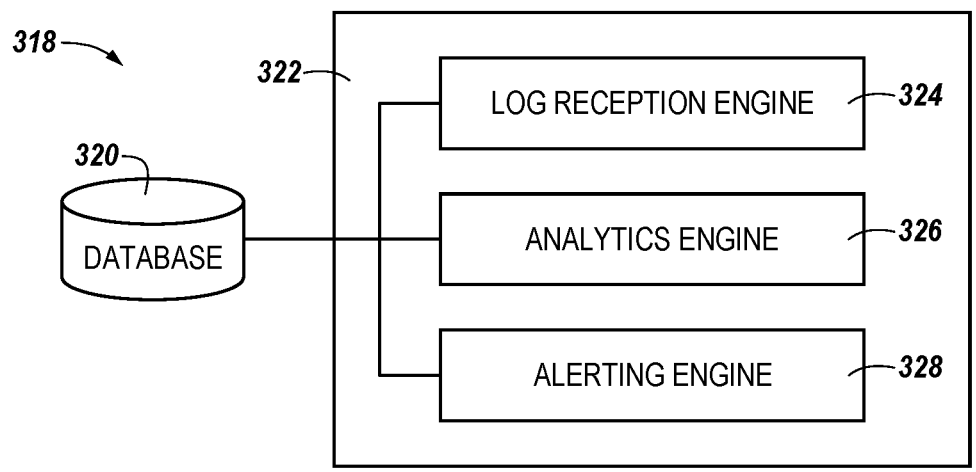
FIG. 3 is a diagram of a general logical system structure implementing taking an action in response to detection of an unsupported language in a log according to the present disclosure.

FIG. 3 is a diagram of a general logical system structure implementing taking an action in response to detection of an unsupported language in a log according to the present disclosure. The system 318 can include a database 320, a subsystem 322, and/or a number of engines, for example a log reception engine 324, an analytics engine 326, and/or an alerting engine 328, and can be in communication with the database 320 via a communication link. The system 318 can include additional or fewer engines than illustrated to perform the various functions described herein. The system 318 can represent program instructions and/or hardware of a machine (e.g., machine 430 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines (e.g., 324, 326, and 328) can include a combination of hardware and program instructions that are configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic such as in the form of an application specific integrated circuit) can be considered as both program instructions and hardware.

In some embodiments, the log reception engine 324 can include a combination of hardware and program instructions that can be configured to receive a log from a log source or a log aggregator. The log can include identifiers of event sources, for instance.

The analytics engine 326 can include a combination of hardware and program instructions that can be configured to analyze a log of a log source and detect an unsupported language in the log. The unsupported language can correspond to a language that is different than a supported language of a log management server. The analytics engine 326 can be configured to maintain the unsupported language in the log such that the integrity of the log is uncompromised. That is, the content of the log may not be changed or affected.

In some embodiments, the alerting engine 328 can include a combination of hardware and program instructions that can be configured to take an action in response to detecting the unsupported language. The action can include denying receipt of future logs containing the unsupported language from the log source and providing an alert of the unsupported language to an administrator device. The administrator device can include, but is not limited to, a mobile device, a laptop computer, or a desktop computer. The alert can include, but is not limited to, an e-mail, a text message (e.g., a SMS message), or an in-management-app alert.

In some embodiments, the action can include determining an availability of a language pack, wherein the language pack corresponds to the unsupported language and downloading the language pack in response to determining that the language pack is available. If it is determined that the language pack is unavailable then the action can include providing an alert of the unsupported language in the log to an administrator device.

Figure 4:
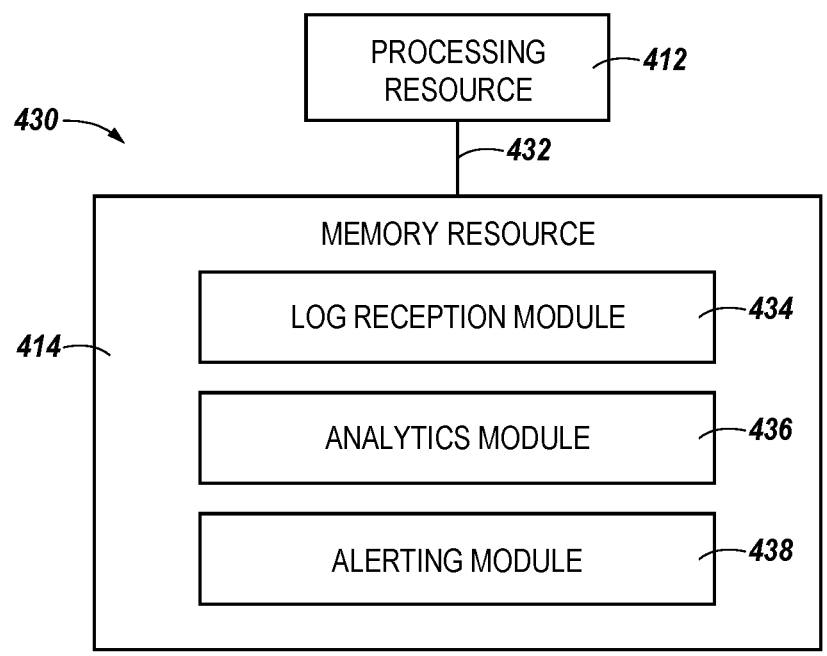
FIG. 4 is a diagram of an example system structure implementing taking an action in response to detection of an unsupported language in a log according to the present disclosure.

FIG. 4 is a diagram of an example system structure implementing taking an action in response to detection of an unsupported language in a log according to the present disclosure. FIG. 4 illustrates a machine 430 for taking an action in response to detection of an unsupported language in a log. The machine 430 can utilize software, hardware, firmware, and/or logic to perform a number of functions. The machine 430 can be a combination of hardware and program instructions configured to perform a number of functions (e.g., actions). The hardware, for example, can include a number of processing resources 412 and a number of memory resources 414, such as a machine-readable medium (MRM) or other memory resources 414. The memory resources 414 can be internal and/or external to the machine 430 (e.g., the machine 430 can include internal memory resources and have access to external memory resources). In some embodiments, the machine 430 can be a log management server, for example, analogous to the log management server 202, previously discussed in connection with FIG. 2. The program instructions (e.g., machine-readable instructions (MRI)) can include instructions stored on the MRM to implement a particular function (e.g., an action such as issuing alerts to log sources). The set of MRI can be executable by one or more of the processing resources 412. The memory resources 414 can be coupled to the machine 430 in a wired and/or wireless manner. For example, the memory resources 414 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources 414 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 412 can be coupled to the memory resources 414 via a communication path 432. The communication path 432 can be local or remote to the machine 430. Examples of a local communication path 432 can include an electronic bus internal to a machine, where the memory resources 414 are in communication with the processing resources 412 via the electronic bus. Examples of such electronic buses can include Industry Standard Architecture (ISA), Peripheral Component Interconnect (PCI), Serial Advanced Technology Attachment (SATA), Small Computer System Interface (SCSI), Universal Serial Bus (USB), among other types of electronic buses and variants thereof. The communication path 432 can be such that the memory resources 414 are remote from the processing resources 412, such as in a network connection between the memory resources 414 and the processing resources 412. That is, the communication path 432 can be a network connection. Examples of such a network connection can include a local area network (LAN), wide area network (WAN), personal area network (PAN), and the Internet, among others.

As shown in FIG. 4, the MRI stored in the memory resources 414 can be segmented into a number of modules 434, 436, and 438 that when executed by the processing resources 412 can perform a number of functions. As used herein a module includes a set of instructions included to perform a particular task or action. The number of modules 434, 436, and 438 can be sub-modules of other modules. For example, the alerting module 438 can be a sub-module of the analytics engine 436 and/or can be contained within a single module. Furthermore, the number of modules 434, 436, and 438 can comprise individual modules separate and distinct from one another. Examples are not limited to the specific modules 434, 436, and 438 illustrated in FIG. 4.

Each of the number of modules 434, 436, and 438 can include program instructions and/or a combination of hardware and program instructions that, when executed by a processing resource 412, can function as a corresponding engine as described with respect to FIG. 3. For example, the log reception module 434 can include program instructions and/or a combination of hardware and program instructions that, when executed by a processing resource 412, can function as the log reception engine 324, the analytics module 436 can include program instructions and/or a combination of hardware and program instructions that, when executed by a processing resource 412, can function as the analytics engine 326, and/or the alerting module 438 can include program instructions and/or a combination of hardware and program instructions that, when executed by a processing resource 412, can function as the alerting engine 328.

Figure 5:
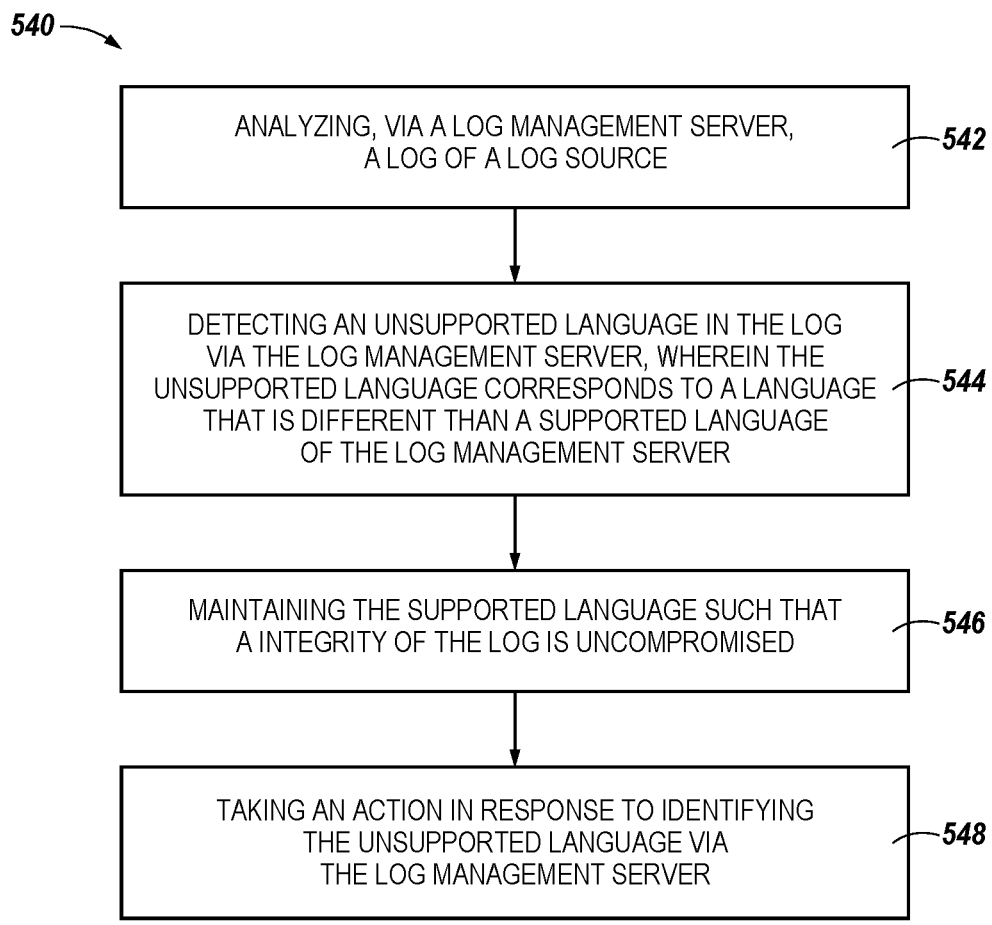
FIG. 5 is a flow chart illustrating a method for detecting an unsupported language in a log according to the present disclosure.

FIG. 5 is a flow chart illustrating a method for detecting an unsupported language in a log according to the present disclosure. At 542, the method 540 can include analyzing, via a log management server, a log of a log source. In some embodiments, the method 540 can include receiving the log from the log source. In some embodiments, the method 540 can include receiving the log from a log aggregator.

At 544, the method 540 can include detecting an unsupported language in the log via the log management server. The unsupported language can include corresponds to a language that is different than a supported language of the log management server.

At 546, the method 540 can include maintaining the unsupported language such that the integrity of the log is uncompromised. That is, the content of the log may not be changed or affected even though fields can be added to the log.

At 548, the method 540 can include taking an action in response to detecting the unsupported language via the log management server. In some embodiments, taking the action can include denying receipt of future logs in the unsupported language from the log source and providing an alert of the unsupported language to an administrator device. In some embodiments, taking the action can include determining an availability of a language pack, wherein the language pack corresponds to the unsupported language, and downloading the language pack in response to determining that the language pack is available. In some embodiments, taking the action can include determining an availability of a language pack, wherein the language pack corresponds to the unsupported language and providing an alert of the unsupported language in the log to an administrator device in response to determining that the language pack is not available.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. A non-transitory machine-readable medium storing instructions executable by a processing resource to cause a log management server to:
   analyze a log of a log source, wherein the log includes an activity that occurs on the log source;
   detect an unsupported language in the log; and
   take an action in response to detecting the unsupported language in the log, wherein taking the action comprises:
   retrieve a language pack corresponding to the unsupported language;
   process the log using a set of rules in the language pack, while maintaining the unsupported language in the log, to identify a pattern in the log; and
   govern the log management server based on the identified pattern.

2. The medium of claim 1, further including instructions to automatically determine what language comprises the unsupported language.

3. The medium of claim 1, wherein the instructions to take the action include instructions to alert an administrator of the log source that the log contained the unsupported language when there is no language pack available.

4. A non-transitory machine-readable medium storing instructions executable by a processing resource to cause a log management server to:
   analyze a log of a log source, wherein the log includes an activity that occurs on the log source;
   detect an unsupported language in the log; and
   take an action in response to detecting the unsupported language in the log, wherein the instructions to take the action include instructions to deny receipt of future logs, from the log source, containing the unsupported language.

5. A system, comprising a log management server coupled to a log source and configured to:
   receive a log from the log source, wherein the log includes an activity that occurs on the log source;
   analyze the log according to a first language pack to detect that text of the log corresponds to a second language pack different than the first pack; and
   take an action in response to text of the log corresponding to the second language pack different than the first language pack, wherein taking the action comprises:
   retrieve the second language pack corresponding to an unsupported language in the log;
   process the log using a set of rules in the second language pack, while maintaining the unsupported language in the log, to identify a pattern in the log; and
   govern the log management server based on the identified pattern.

6. The system of claim 5, wherein the log management server being further configured to recognize a trigger of the log that facilitates identification of the second language pack associated with the unsupported language.

7. The system of claim 6, wherein the log management server is further configured to automatically download the second language pack in response to identification of the second language pack being different than the first language pack.

8. The system of claim 7, wherein the log management server is further configured to automatically process the log with the second language pack after downloading the second language pack.

9. The system of claim 5, wherein the log management server being configured to analyze the log according to the first language pack comprises being configured to analyze the log in an original language of the log.

10. A system, comprising a log management server coupled to a log source and configured to:
receive a log from the log source, wherein the log includes an activity that occurs on the log source;
analyze the log according to a first language pack; and
take an action in response to text of the log corresponding to a second language pack different than the first language pack, wherein taking the action comprises denying receipt of future logs, from the log source, containing an unsupported language in the log and to provide an alert to an administrator device.

11. A method, comprising:
analyzing, via a log management server, a log of a log source, wherein the log includes an activity that occurs on the log source;
detecting an unsupported language in the log via the log management server, wherein the unsupported language corresponds to a language that is different than a supported language of the log management server;
maintaining the unsupported language such that an integrity of the log is uncompromised; and
taking an action in response to detecting the unsupported language via the log management server, wherein taking the action comprises:
retrieving a language pack corresponding to the unsupported language;
processing the log using a set of rules in the language pack, while maintaining the unsupported language in the log, to identify a pattern in the log; and
governing the log management server based on the identified pattern.

12. A method, comprising:
analyzing, via a log management server, a log of a log source, wherein the log includes an activity that occurs on the log source;
detecting an unsupported language in the log via the log management server, wherein the unsupported language corresponds to a language that is different than a supported language of the log management server;
maintaining the unsupported language such that an integrity of the log is uncompromised; and
taking an action in response to detecting the unsupported language via the log management server, wherein taking the action comprises:
denying receipt of future logs in the unsupported language from the log source; and
providing an alert of the unsupported language to an administrator device.

13. The method of claim 11, wherein taking the action comprises:
determining an availability of the language pack, wherein the language pack corresponds to the unsupported language; and
downloading the language pack in response to determining that the language pack is available.

14. The method of claim 11, wherein taking the action comprises:
determining an availability of the language pack, wherein the language pack corresponds to the unsupported language; and
providing an alert of the unsupported language in the log to an administrator device in response to determining that the language pack is not available.

15. The method of claim 11, further comprising receiving the log from the log source.

16. The method of claim 11, further comprising receiving the log from a log aggregator.

* * * * *